US012543850B1

(12) United States Patent
Do et al.

(10) Patent No.: US 12,543,850 B1
(45) Date of Patent: Feb. 10, 2026

(54) FOLDABLE CABINET

(71) Applicants: THANH PHONG PRODUCTION AND TRADE LIMITED COMPANY, Bac Ninh Province (VN); SUNRISE INDUSTRIES CORPORATION, Sacramento, CA (US)

(72) Inventors: Phu The Do, Bac Ninh Province (VN); Kim-Dung Thi Nguyen, Bac Ninh Province (VN)

(73) Assignee: THANH PHONG PRODUCTION AND TRADE, California (CA)

( * ) Notice: Subject to any disclaimer, the term of this patent is extended or adjusted under 35 U.S.C. 154(b) by 0 days.

(21) Appl. No.: 19/230,523

(22) Filed: Jun. 6, 2025

(51) Int. Cl.

| | |
|---|---|
| ***A47B 43/00*** | (2006.01) |
| ***E05D 3/06*** | (2006.01) |
| *A47B 46/00* | (2006.01) |
| *A47B 47/00* | (2006.01) |
| *E05D 3/12* | (2006.01) |

(52) U.S. Cl.
CPC ............ *A47B 43/00* (2013.01); *A47B 46/005* (2013.01); *A47B 47/00* (2013.01); *A47B 2220/0072* (2013.01); *E05D 3/12* (2013.01); *E05Y 2900/20* (2013.01)

(58) Field of Classification Search
CPC ......... A47B 43/00; A47B 43/02; A47B 47/00; A47B 47/02; A47B 47/042; A47B 2220/0072; E05Y 2900/20; E05D 3/12
USPC ............................................................ 16/225
See application file for complete search history.

(56) References Cited

U.S. PATENT DOCUMENTS

| | | | | |
|---|---|---|---|---|
| 236,124 A * | 12/1880 | Washburn | E05D 5/02 | 16/373 |
| 333,854 A * | 1/1886 | Hart | E05D 3/02 | 16/387 |
| 828,649 A * | 8/1906 | Greenawalt | E05D 3/12 | 16/366 |
| 2,722,899 A * | 11/1955 | Brown | B61D 17/048 | 105/423 |
| 2002/0084607 A1* | 7/2002 | King | A47B 43/00 | 280/47.35 |
| 2004/0150302 A1* | 8/2004 | McBrayer, III | A47B 43/00 | 312/258 |

(Continued)

FOREIGN PATENT DOCUMENTS

WO WO-2007110111 A1 * 10/2007 ............. A47B 43/00

*Primary Examiner* — Kimberley S Wright
(74) *Attorney, Agent, or Firm* — Blue Capital Law Firm, P.C.

(57) ABSTRACT

A foldable or collapsible cabinet is disclosed. In one embodiment, the cabinet can be easily and readily folded or collapsed from an expanded usable configuration into a substantially flat and compact configuration that would occupy minimum storage space and would be easily and economically handled for transportation and/or shipping. The storage cabinet includes a front, a back wall, a first sidewall and a second sidewall rotatably coupled to the front and to the back wall, wherein each sidewall is rotated inward when the cabinet is folded or collapsed, and outward when the foldable is expanded, and wherein each sidewall includes a front portion pivotally coupled to a back portion such that the front portion and the back portion are folded when the cabinet is folded or collapsed, and expanded when the cabinet is expanded into a usable configuration.

7 Claims, 17 Drawing Sheets

(56) References Cited

U.S. PATENT DOCUMENTS

| | | | | |
|---|---|---|---|---|
| 2007/0210682 | A1* | 9/2007 | Wise | A47B 87/00 312/108 |
| 2013/0221818 | A1* | 8/2013 | Ceballos Godefroy | A47F 5/10 312/258 |
| 2020/0037758 | A1* | 2/2020 | Kagan | A47B 43/00 |
| 2023/0189985 | A1* | 6/2023 | Doherty | E05D 3/12 312/258 |

* cited by examiner

FOLDABLE CABINET

FIELD

This disclosure generally relates to cabinets, and more particularly, to a cabinet that is foldable or collapsible.

BACKGROUND

Storage cabinets are typically bulky units with a fixed size that occupy a generally fixed amount of space. Furthermore, these storage cabinets are time consuming to assemble and are cumbersome to handle, store, and/or transport. It would be useful to have a storage that can be easily and readily folded or collapsed from an expanded usable configuration into a substantially flat and compact configuration to handle and transport, and that can be easily and readily expanded from a folded and collapsed configuration into a usable configuration.

SUMMARY

An object of the present invention is to provide a storage cabinet that can be easily and readily folded or collapsed from an expanded usable configuration into a substantially flat and compact configuration that would occupy minimum storage space and would be easily and economically handled for transportation and/or shipping.

In one embodiment, the inventive cabinet includes a back, a front, and opposite sidewalls that are rotatably coupled along the four vertical corners of the cabinet such that the sidewalls could be rotated inward when the cabinet is collapsed into the folded configuration, and outward when the cabinet is expanded into a usable configuration. Furthermore, the sidewalls are formed by pivotally coupling or connecting panels with hinges such that the sidewalls could be folded when the cabinet is collapsed into the folded configuration, and expanded when the cabinet is expanded into a usable configuration.

In one embodiment, the inventive cabinet includes one or more shelves that are rotatably coupled to the back of the cabinet such that the one or more shelves could be folded upward toward the back of the cabinet to save occupying space when the cabinet is in a folded or collapsed configuration, and could be folded downward toward the front of the cabinet when the cabinet is in an expanded usable configuration.

In one embodiment, the inventive cabinet includes a cabinet bottom that is rotatably coupled to the back of the cabinet such that the cabinet bottom could be folded upward toward the back of the cabinet to save occupying space when the cabinet is in a folded or collapsed configuration, and could be folded downward toward the front of the cabinet when the cabinet is in an expanded usable configuration.

In one embodiment, the inventive cabinet includes a removable top that could be removed when the cabinet is in a folded or collapsed configuration, and could be coupled to the cabinet to form the cabinet top when the cabinet is in an expanded usable configuration.

Other features and advantages of the present inventive cabinet will appear and will be discussed more fully in the context of the drawings, the detailed description of the drawings and the claims.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts. Also, wherever possible, the same reference numbers will be used throughout the drawings to refer to the same or the like parts.

Figure 1A:
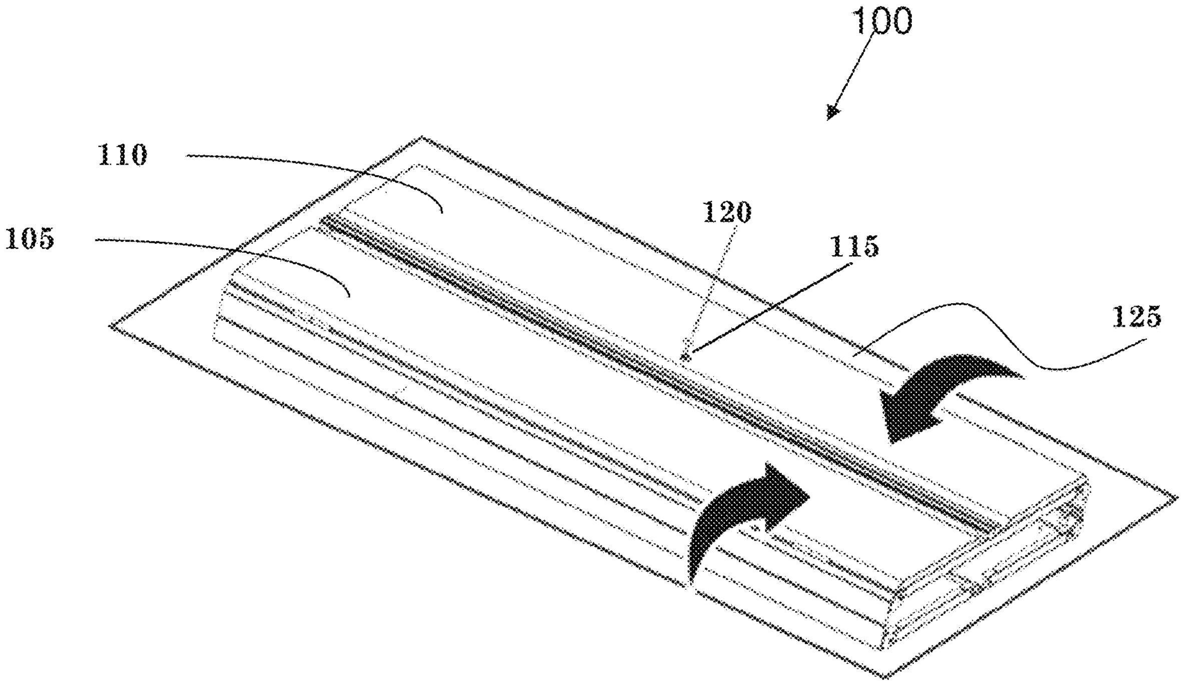
FIGS. 1A and 1B show a cabinet in a folded or collapsed configuration being laid flat on a protective pad according to one exemplary embodiment.
Figure 1B:
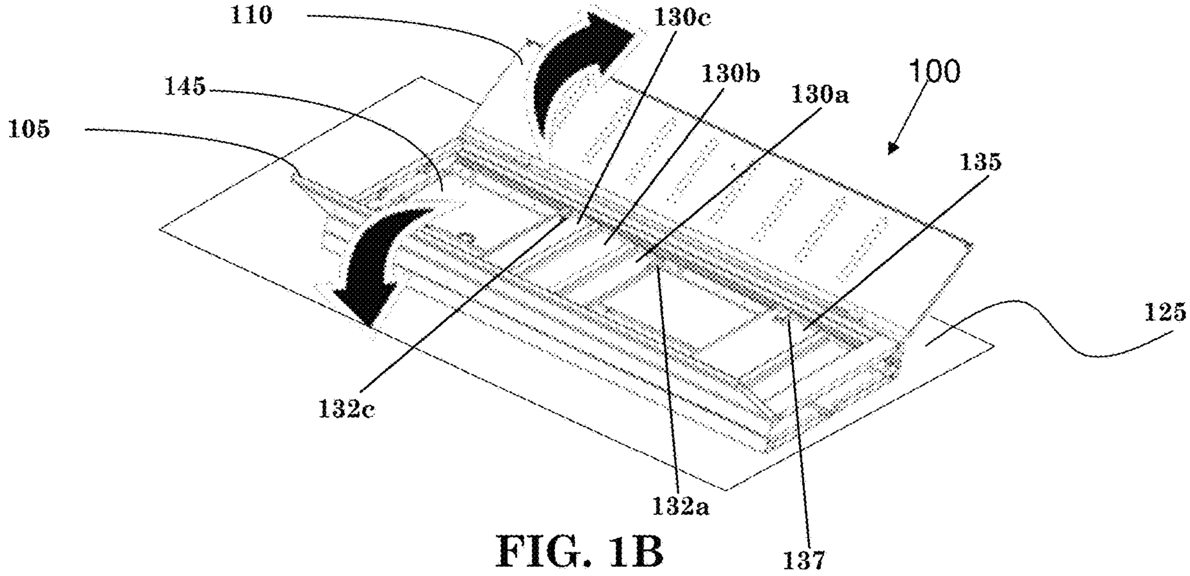

Referring to FIGS. 1A and 1B, a cabinet 100 in a folded or collapsed configuration being laid flat on a protective pad 125 according to one exemplary embodiment. The folded or collapsed cabinet 100 includes a left door 105 and a right door 110. The right door 110 has a lock 115. A key 120 can be used to lock or unlock the doors.

Figure 2:
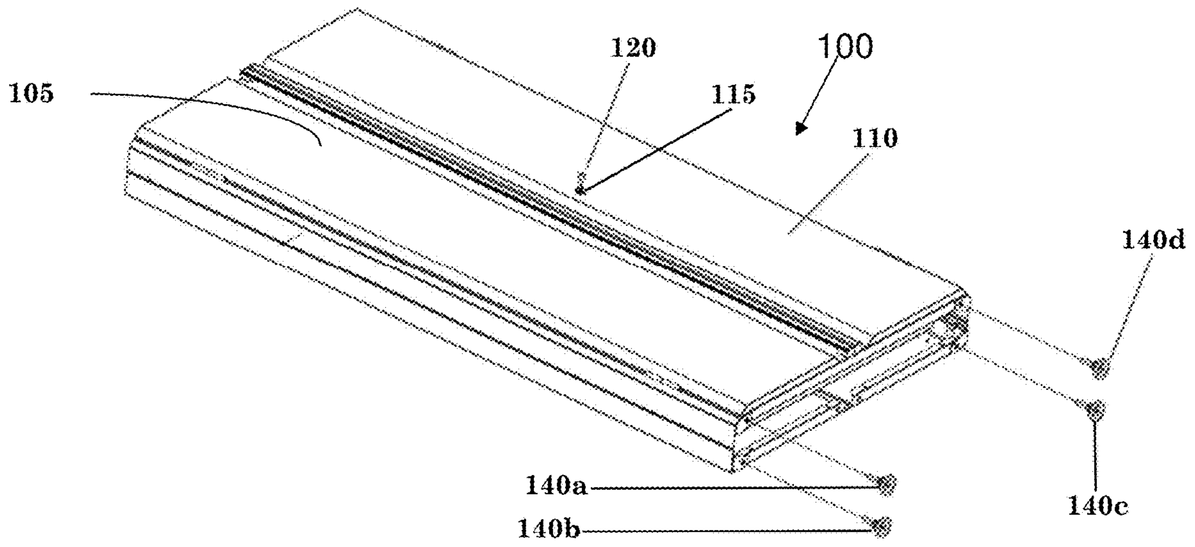
FIG. 2 illustrates a cabinet in a folded or collapsed configuration being laid flat and shown with leveler feet according to one exemplary embodiment.

FIG. 1A shows the folded or collapsed cabinet with the doors 105 and 110 being closed according to one exemplary embodiment. FIG. 1B shows the folded or collapsed cabinet with the doors 105 and 110 being unlocked and opened. As shown in FIG. 1B, in one embodiment, the cabinet 100 includes a cabinet bottom 135 and three cabinet shelves 130*a*, 130*b*, and 130*c*. In this embodiment, when the cabinet is in a folded or collapsed configuration, the cabinet bottom 135 can be folded up and back toward the cabinet back wall 145 to save occupying space. A cabinet bottom latch 137 can be used to hold and secure the cabinet bottom 135 in place. In this embodiment, when the cabinet is in a folded or collapsed configuration, the cabinet shelves 130*a*, 130*b*, and 130*c* can be folded up and back toward the cabinet back wall 145 to save occupying space. Four cabinet shelf latches 132*a*, 132*b*, 132*c* and 132*d* can be used to hold and secure the cabinet shelves 130*a*, 130*b*, and 130*c* in place. As shown in FIG. 2, in one embodiment, leveler feet 140*a*, 140*b*, 140*c*, and 140*d* can be coupled to the bottom of the cabinet 100 to help balance and stabilize the cabinet when it is raised to an upright position.

Figure 3A:
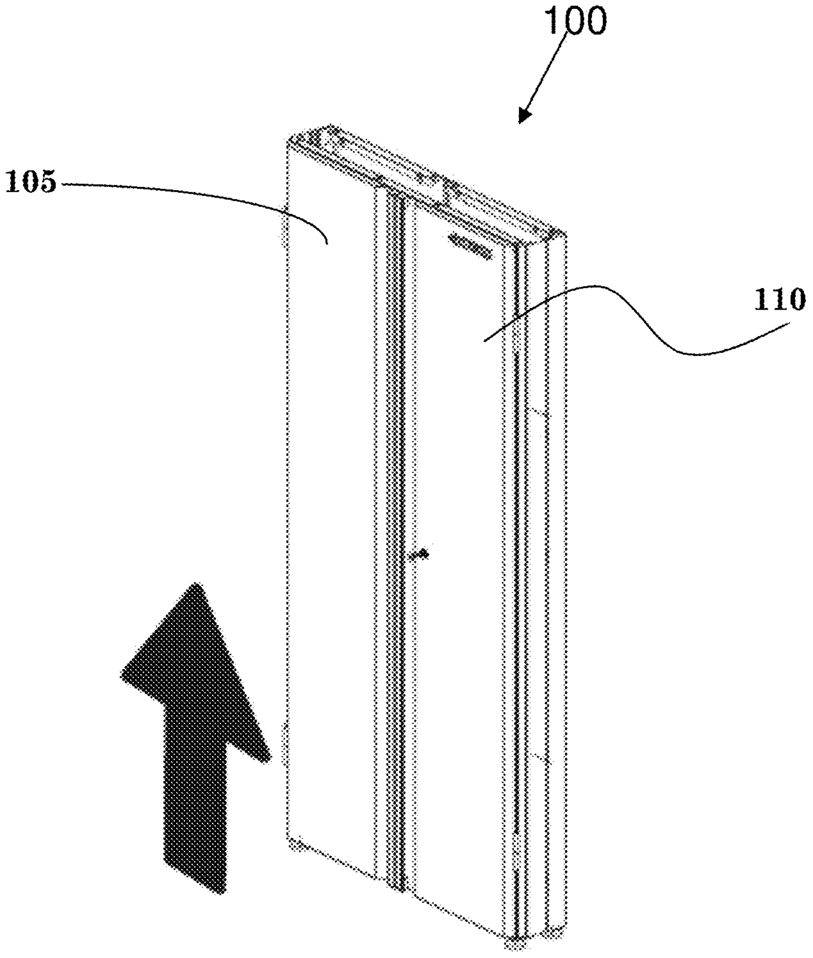
FIG. 3A shows a cabinet in an upright position in a folded or collapsed configuration according to one exemplary embodiment
Figure 3B:
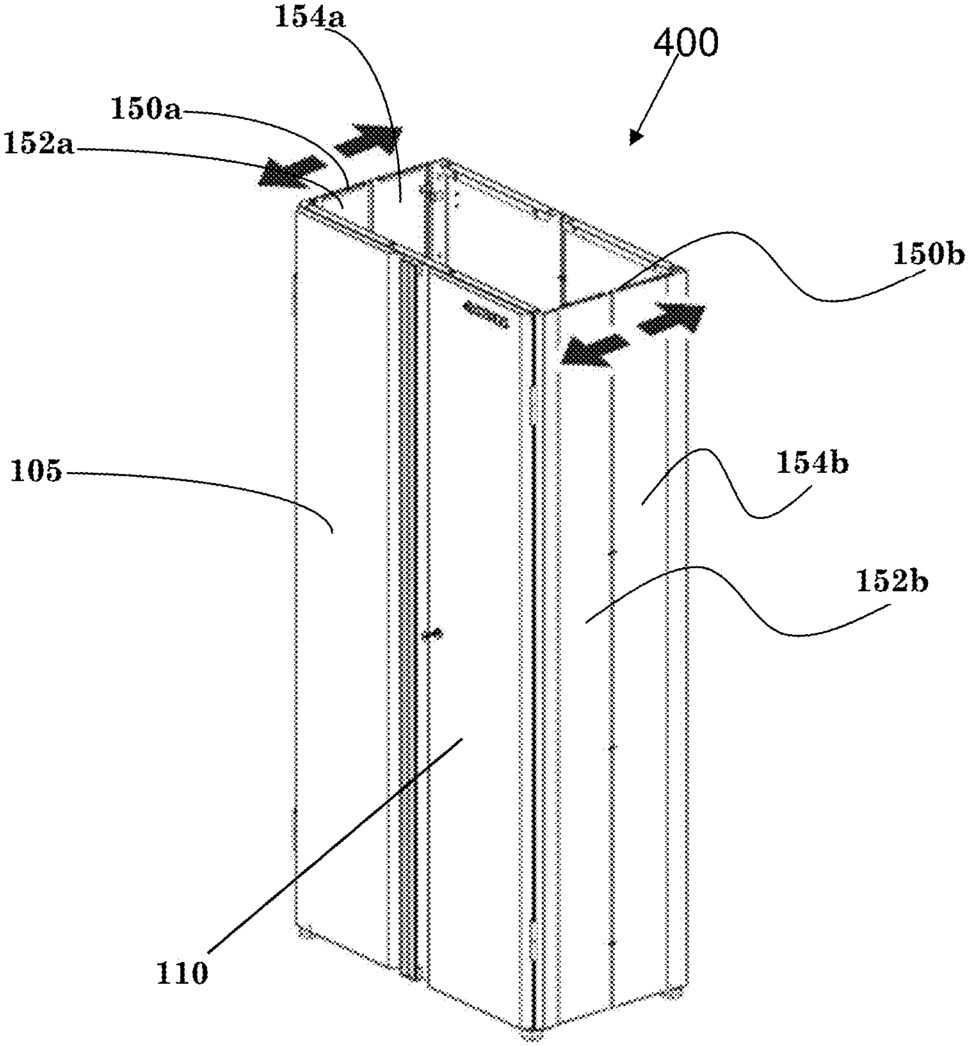
FIG. 3B shows a cabinet in an upright position in an expanded configuration according to one exemplary embodiment.

FIG. 3A shows the cabinet 100 in an upright position with the doors 105 and 110 closed and with the sidewalls (not shown) folded or collapsed according to one exemplary embodiment. FIG. 3B shows the cabinet 100 in an upright position with the doors 105 and 110 closed and with the sidewalls 150*a* and 150*b* expanded according to one exemplary embodiment.

Each side wall 150*a* and 150*b* has a front portion 152*a* and 152*b* and a back portion 154*a* and 154*b*, and can be folded. The front portion 152*a* and 152*b* of each foldable sidewall 150*a* and 150*b* is rotatably coupled to the front of the cabinet in a manner that would enable the front portion 152*a* and 152*b* of the sidewall 150*a* and 150*b* to rotate inward (when the cabinet 100 is folded or collapsed as shown in FIG. 3A) and outward (when the cabinet 100 is expanded as shown in FIG. 3B).

Similarly, the back portion 154*a* and 154*b* of each foldable sidewall 150*a* and 150*b* is rotatably coupled to the back of the cabinet in a manner that would enable the back portion 154*a* and 154*b* of the sidewall 150*a* and 150*b* could rotate inward (when the cabinet 100 is folded or collapsed as shown in FIG. 3A) and outward (when the cabinet 100 is expanded as shown in FIG. 3B). In one embodiment, door hinges with split pins could be used to rotatably coupled the front portions 152*a* and 152*b* of the sidewalls 150*a* and 150*b* to the front of the cabinet, and the back portions 154*a* and 154*b* of the sidewalls 150*a* and 150*b* to the back of the cabinet.

The front portion 152*a* and 152*b* of each foldable sidewall 150*a* and 150*b* is rotatably coupled to the back portion 154*a* and 154*b* of the sidewall 150*a* and 150*b* in a manner that would enable the sidewall to be rotated inward in a collapsed position as shown in FIG. 3A, and rotated outward in an expanded position as shown in FIG. 3B. In one embodiment, strap hinges (shown as elements 156*a*, 156*b*, 156*c*, and 156*d* in FIG. 4A) can be used to couple the front portion 152*a* and 152*b* and back portion 154*a* and 154*b* to form the foldable sidewall 150*a* and 150*b*.

Figure 3C:
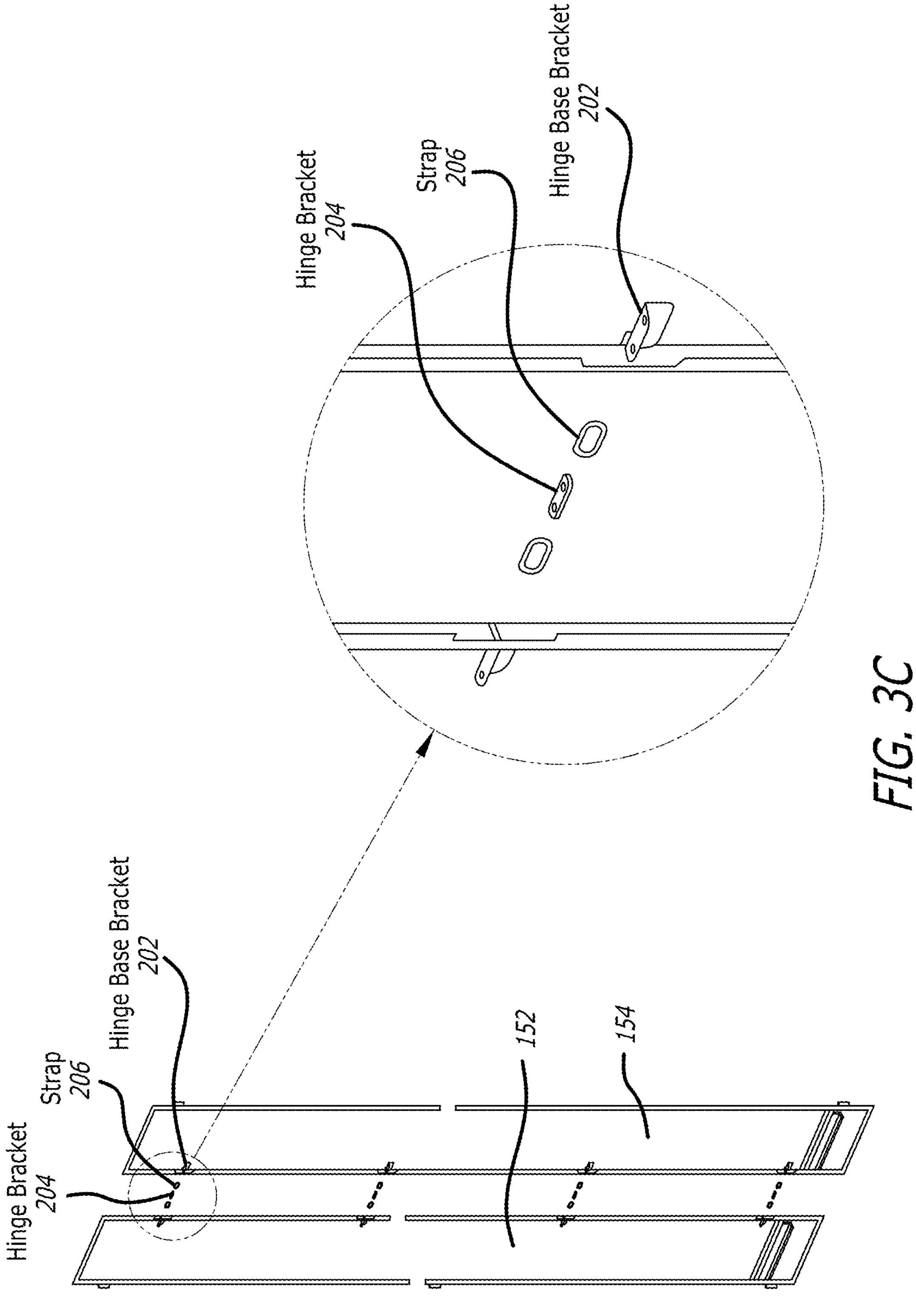
FIGS. 3C and 3D illustrate strap hinges used to rotatably couple the front portion and the back portion of a foldable sidewall according to one exemplary embodiment.
Figure 3D:
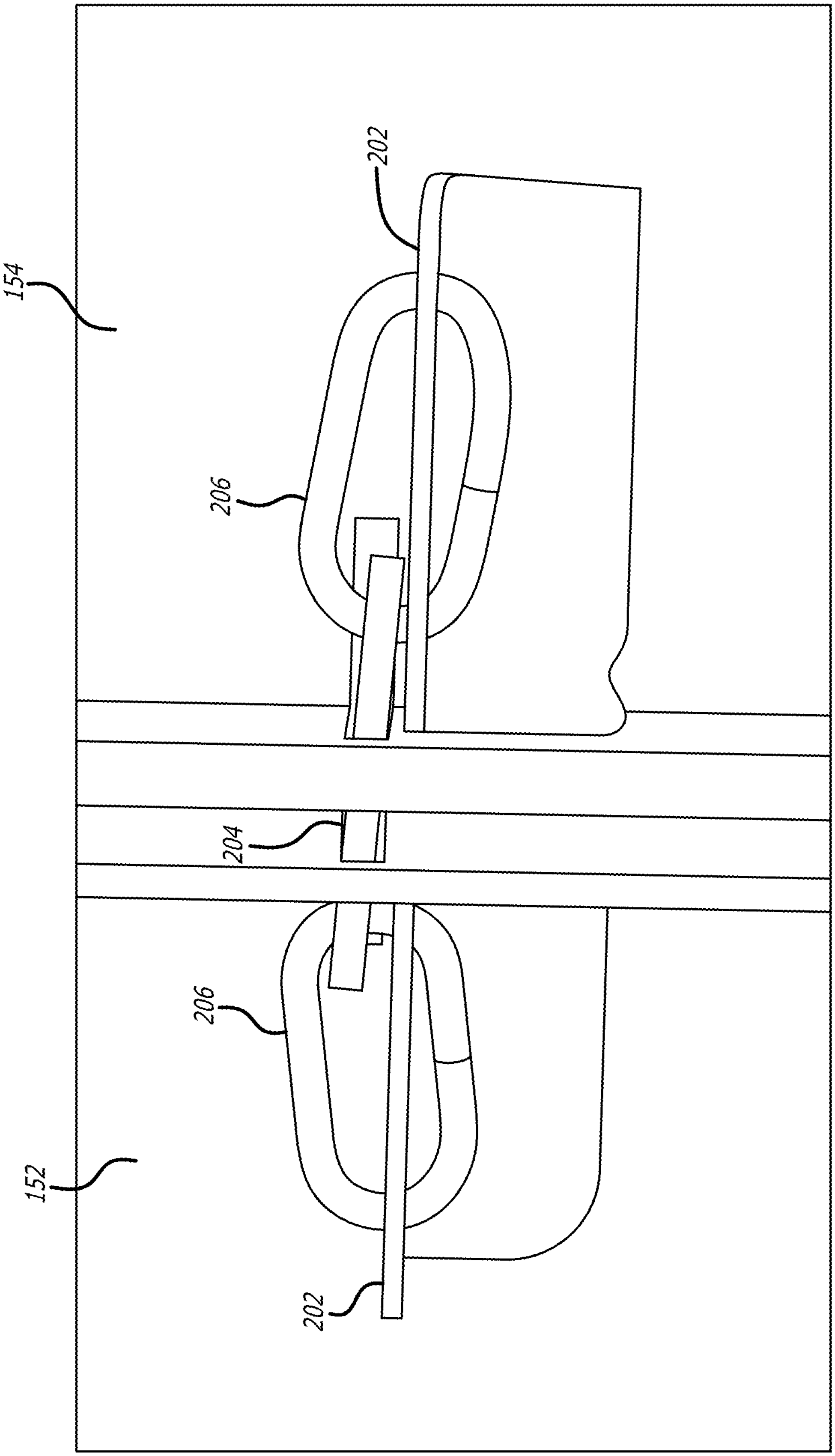

FIGS. 3C and 3D illustrate strap hinges used to rotatably couple the front portion 152 and the back portion 154 of a foldable sidewall according to one exemplary embodiment. A hinge base bracket 202 is mounted on each of the portion 152 and 154 of the foldable sidewall. A hinge bracket 204 is placed on top of the hinge base brackets 202. Strap portions 206 are inserted at each end of the hinge bracket 204, through the hinge bracket 204, and rotatably couple the hinge bracket 204 to the hinge base brackets 202. In this configuration, the portions 152 and 154 of the sidewall are held together. Furthermore, the strap portions 206 could rotate around the ends of the hinge bracket 204 to allow the portions 152 and 154 of the sidewall to be rotated and folded.

Figure 4A:
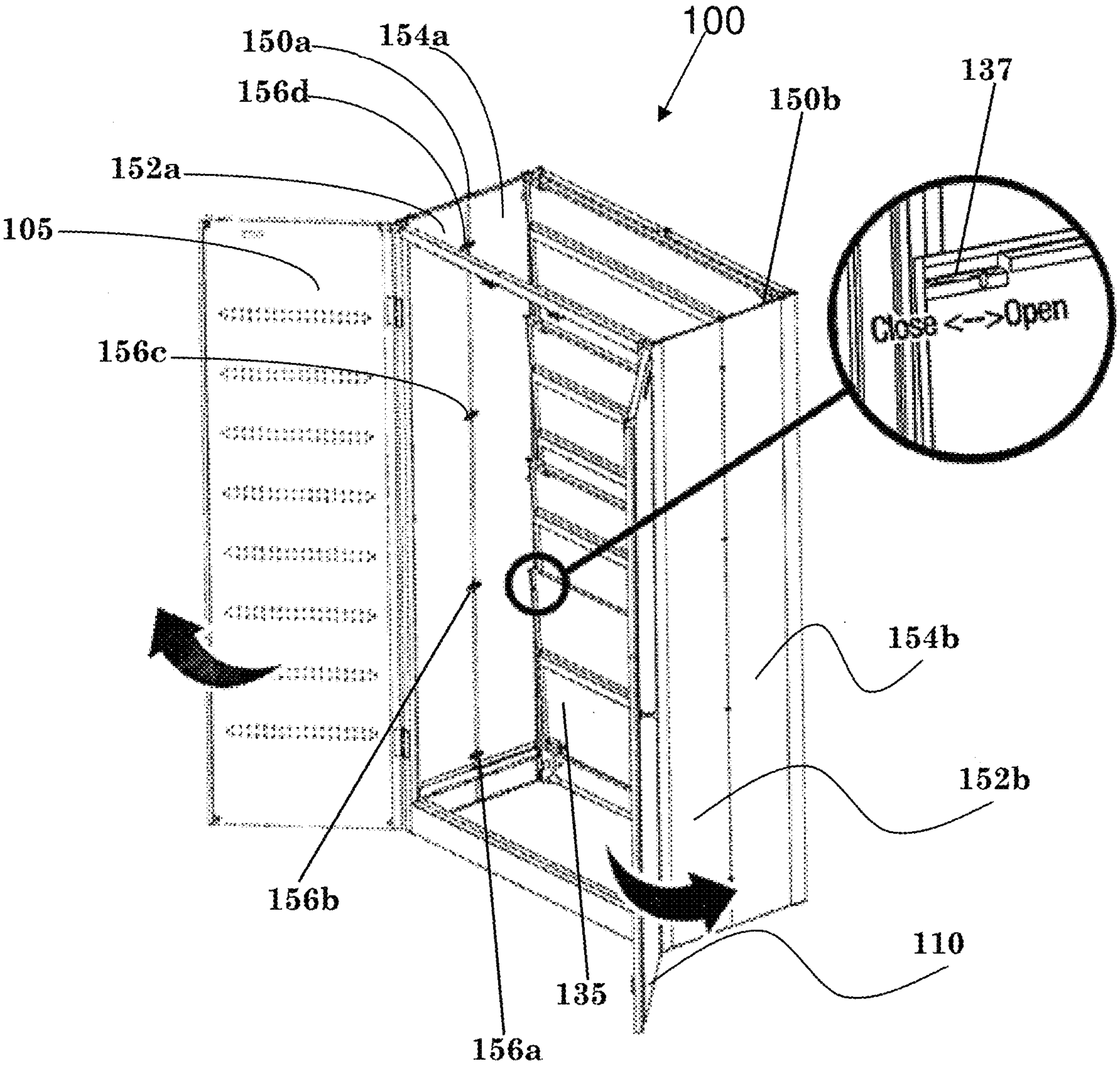
FIGS. 4A and 4B illustrate a cabinet in an upright position in an expanded configuration with the doors opened according to one exemplary embodiment.

FIGS. 4A-4B and 5A-5C show the cabinet 100 with the sidewalls 150*a* and 150*b* expanded and with the doors 105 and 110 opened according to one exemplary embodiment. As shown in FIG. 4A, the cabinet bottom 135 is folded upward and backward toward the back of the cabinet. A cabinet bottom latch 137 can be used to secure and hold the cabinet bottom in place when the cabinet bottom is folded upward and backward. When the latch 137 is moved to the open position, the cabinet bottom is released and can be folded down and put in place to form the bottom of the cabinet.

Figure 4B:
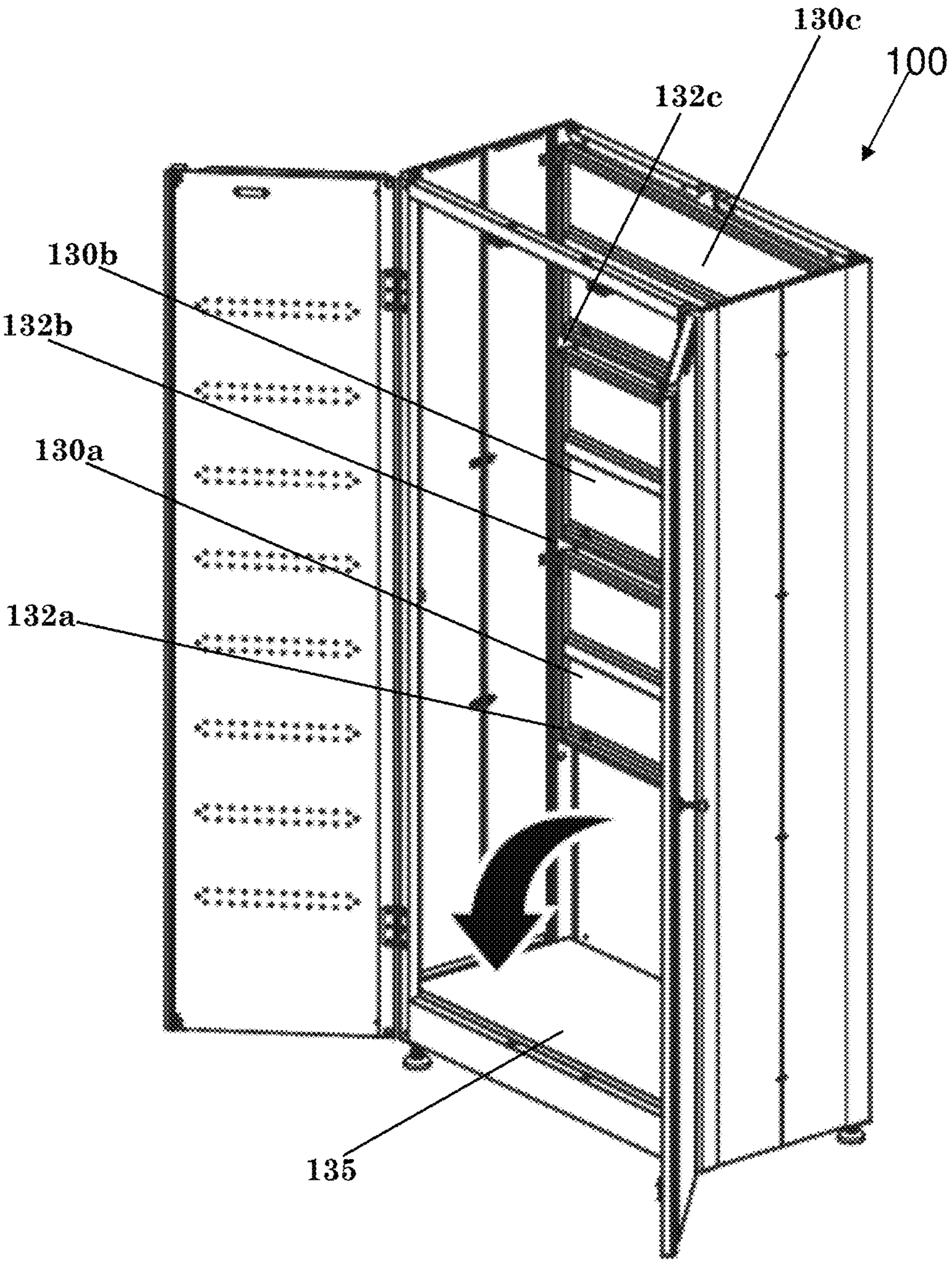

In summary, as shown in FIGS. 4A and 4B, the cabinet includes a bottom 135 that can be folded upward and backward to reduce occupying space when the cabinet 100 is in a folded or collapsed configuration, and can be folded down and put in place to form the bottom of the cabinet when the cabinet 100 is expanded to a usable form. When the cabinet bottom 135 is folded down and put in place, the cabinet bottom 135 provides additional structural support to the expanded cabinet 100.

Figure 5A:
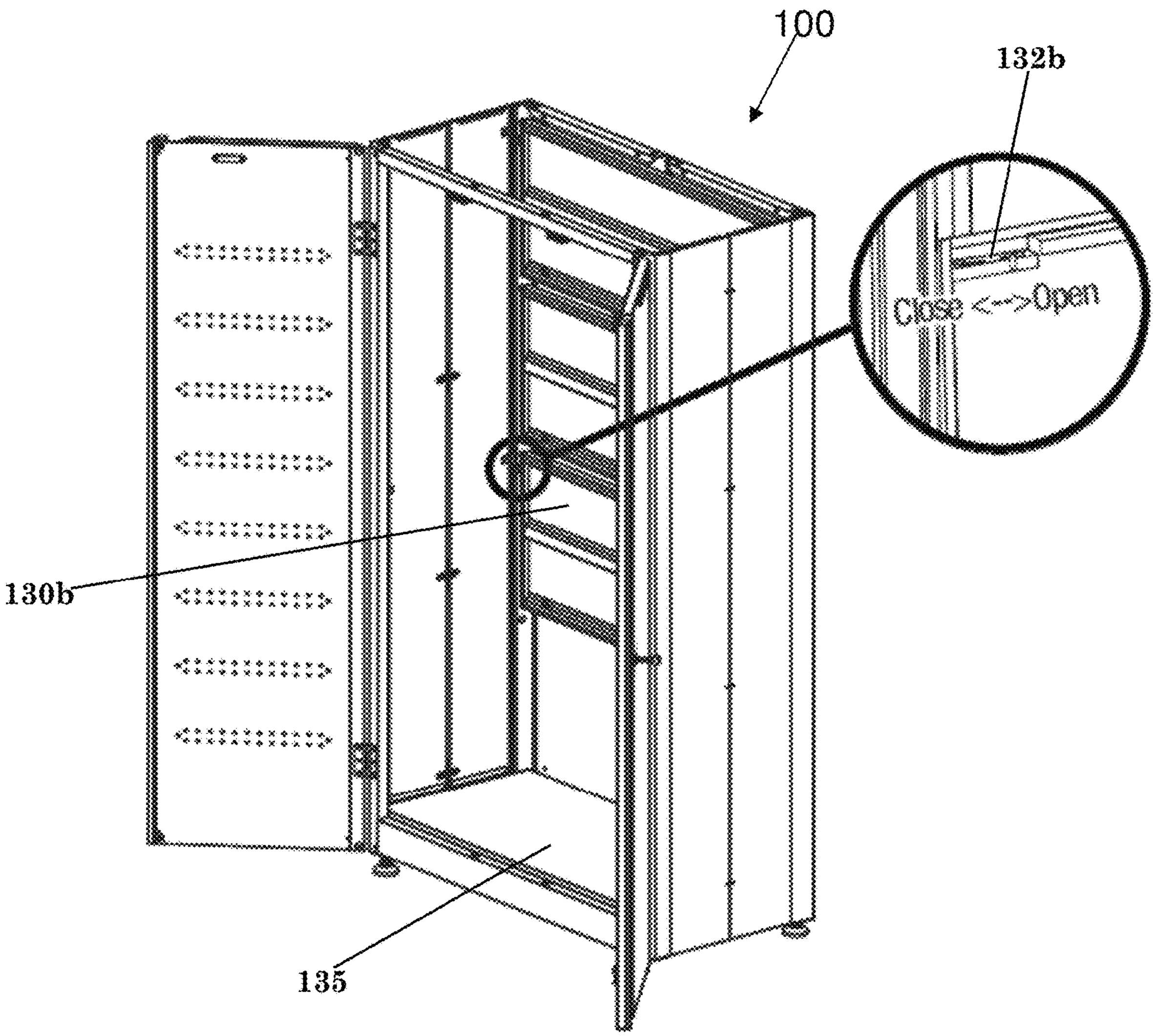
FIGS. 5A-5C show a cabinet in an upright position in an expanded configuration with the doors opened according to one exemplary embodiment.
Figure 5B:
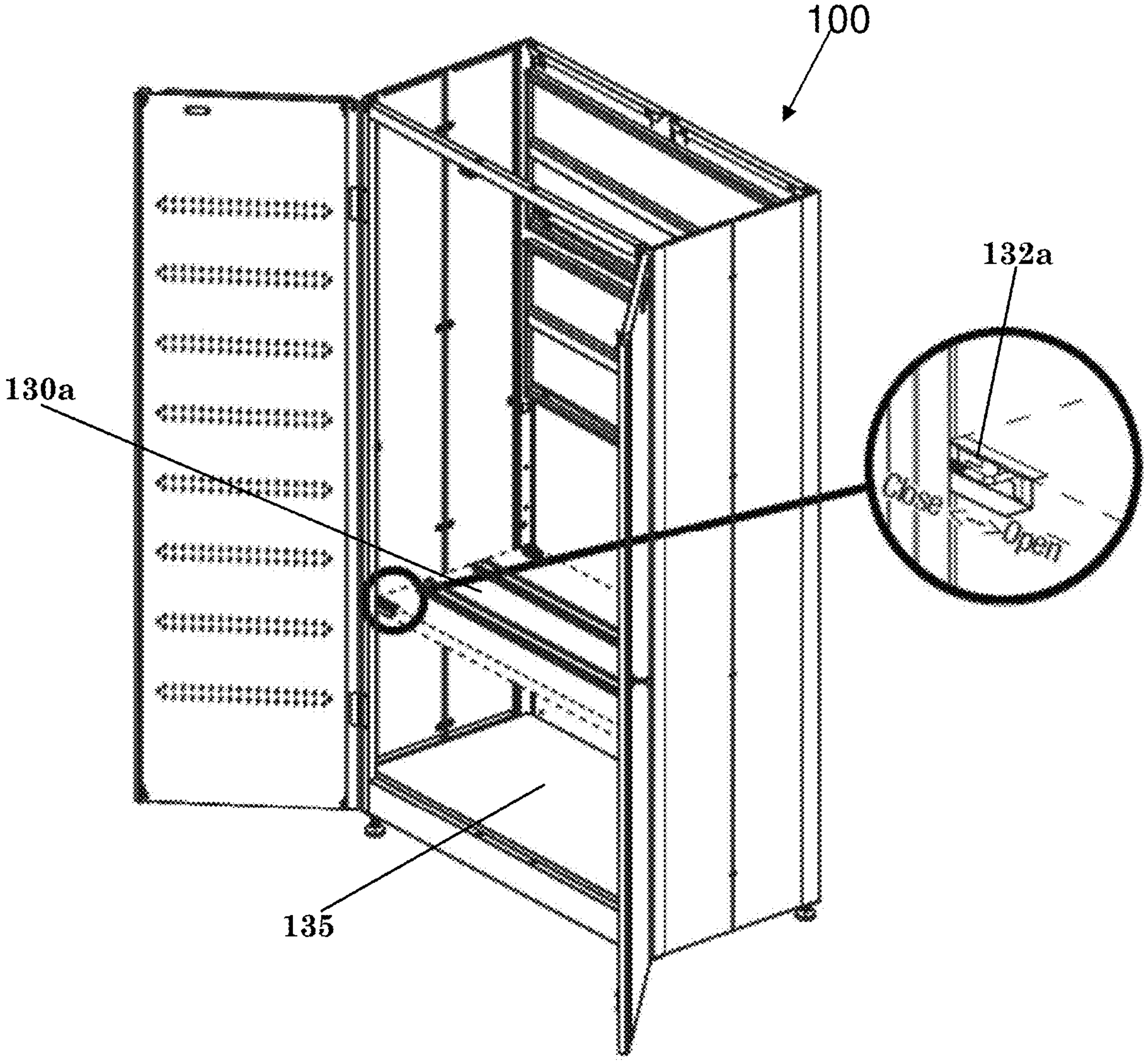
Figure 5C:
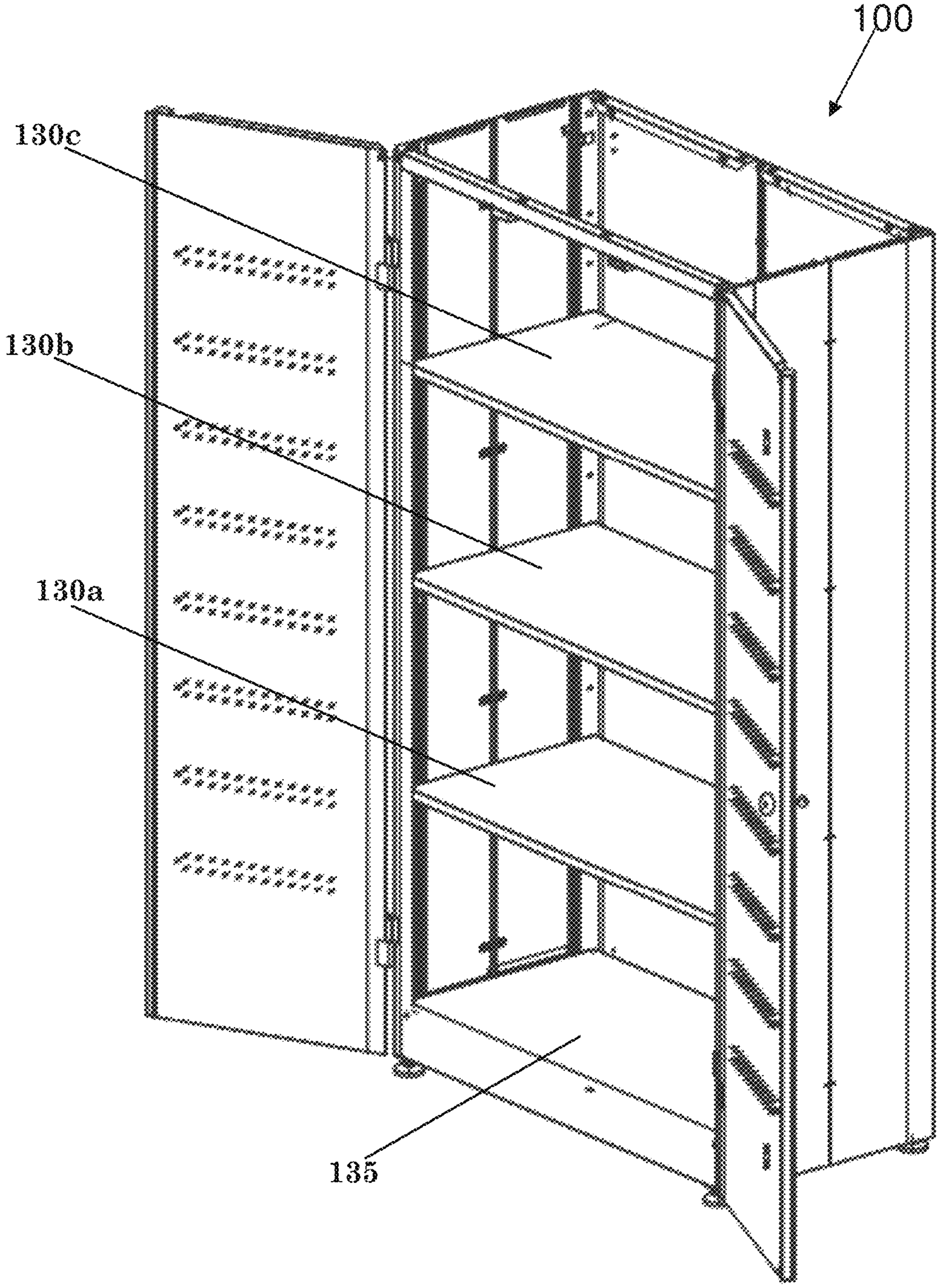

As shown in FIG. 5A, the cabinet bottom 135 is folded down and put in place to form the bottom of the cabinet. FIG. 5A also shows shelves 130*a*, 130*b*, and 130*c* being folded upward and backward. Each shelf 130*a*, 130*b*, and 130*c* has a latch 132*a*, 132*b*, and 132*c* that can be used to secure and hold the shelf in place when the shelf is folded upward and backward. When the latch 132*a*, 132*b*, and 132*c* is moved to the open position, the shelf 130*a*, 130*b*, and 130*c* is released and can be folded down and put in place of form a shelf of the cabinet. FIG. 5B shows the first shelf 130*a* being folded down to form a shelf of the cabinet. Once the shelf is folded down, the latch 132*a* can be used to secure and hold the shelf 130*a* in place. FIG. 5C shows the second shelf 130*b* and the third shelf 130*c* being folded down and put in place to form additional shelves of the cabinet.

In summary, as shown in FIGS. 5A, 5B, and 5C, the cabinet 100 includes shelves 130*a*, 130*b*, and 130*c* that can be folded upward and backward when the cabinet is folded or collapsed, and can be folded down and put in place to form shelves of the cabinet when the cabinet is expanded to a usable form. When the shelves 130*a*, 130*b*, and 130*c* are folded down and put in place, the shelves 130*a*, 130*b*, and 130*c* provide additional structural support to the expanded cabinet.

Figure 6A:
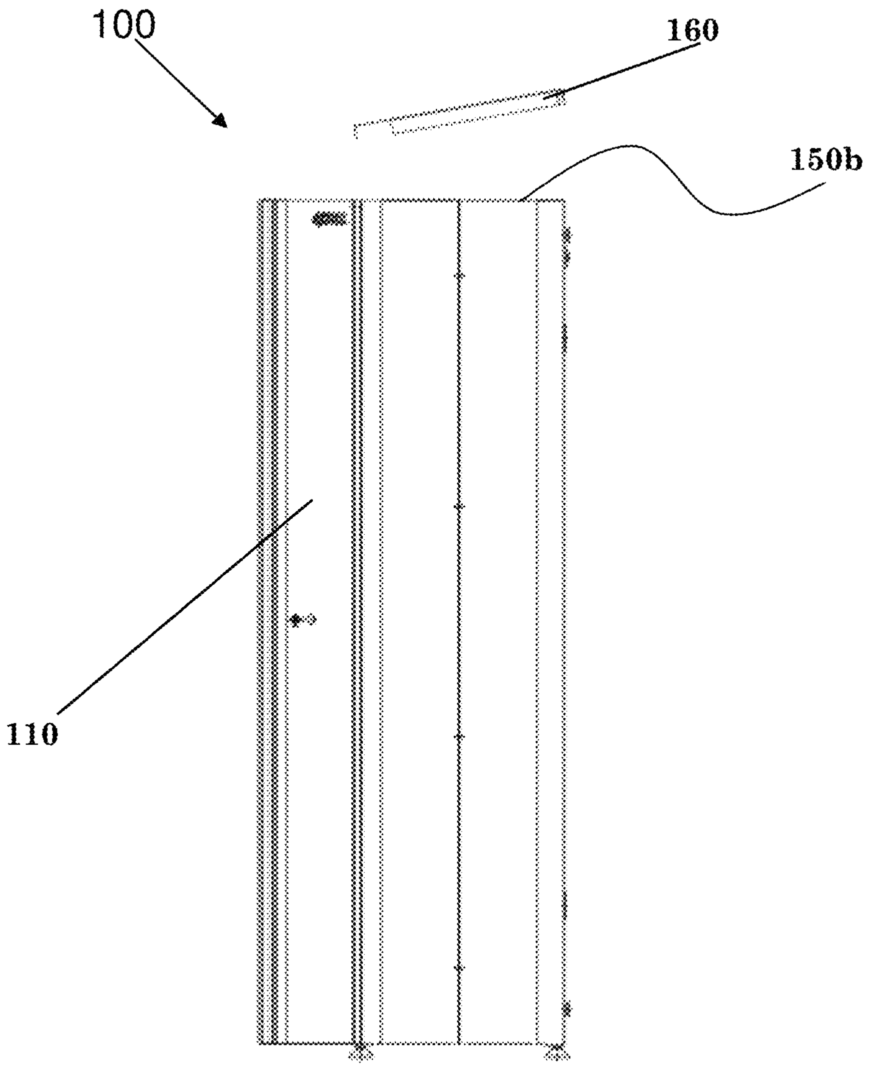
FIG. 6A shows an exploded side view of a cabinet with a detached cabinet top according to one exemplary embodiment.
Figure 6B:
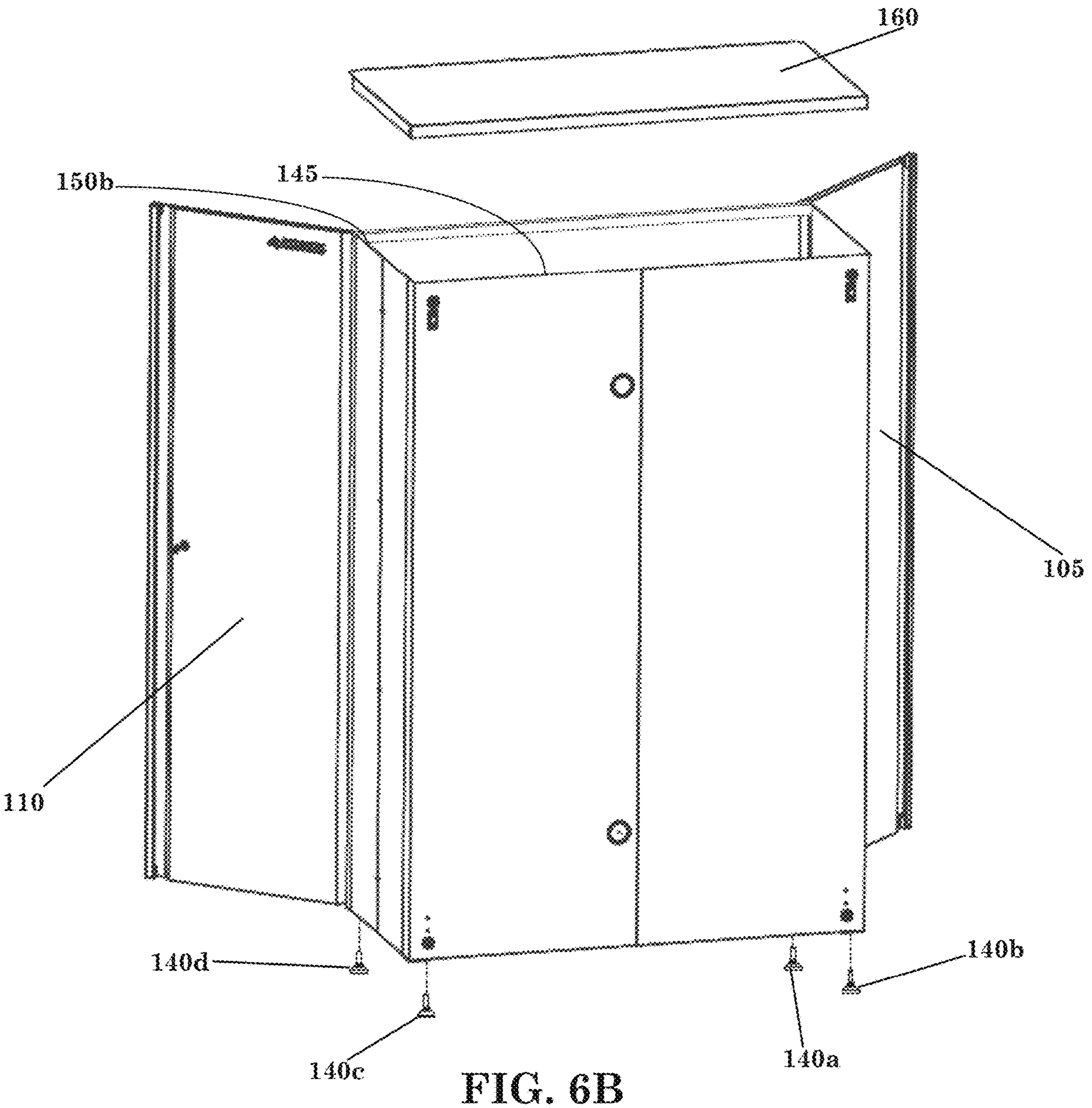
FIG. 6B shows an exploded back perspective view of a cabinet with a detached cabinet top according to one exemplary embodiment.
Figure 7:
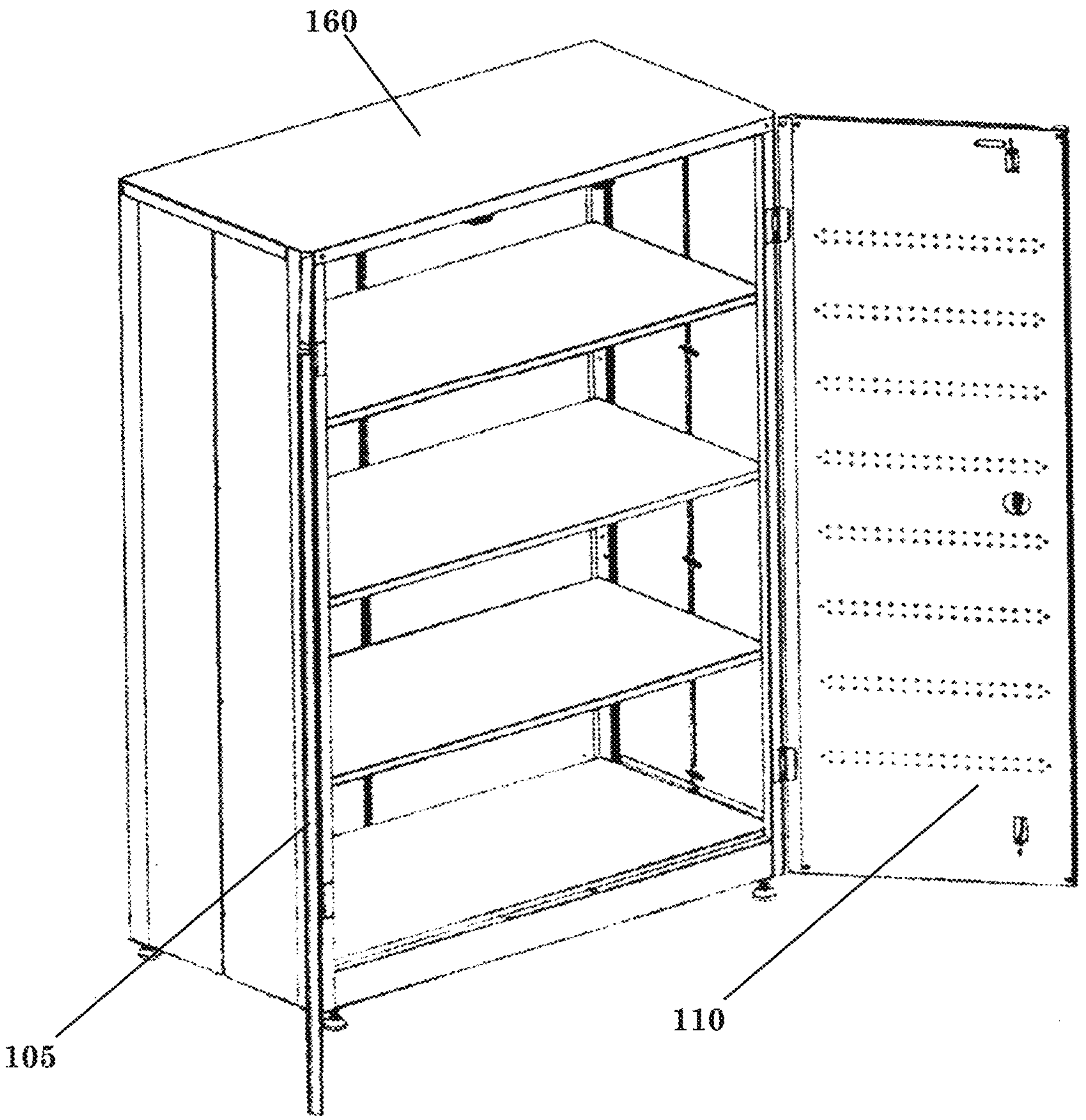
FIG. 7 illustrates a front perspective view of a cabinet with a cabinet top attached or coupled to the cabinet according to one exemplary embodiment.

FIGS. 6A and 6B respectively show an exploded side view and an exploded back perspective view of the cabinet 100 with a detached cabinet top 160 according to one exemplary embodiment. FIG. 7 shows a front perspective view of the cabinet 100 with the cabinet top 160 attached or coupled to the cabinet 100 to form the top of the cabinet according to one exemplary embodiment. In other words, the cabinet 100 includes a cabinet top 160 that can be detached or decoupled from the cabinet 100 to allow the cabinet 100 to be folded or collapsed, and can be attached or coupled to the cabinet when the cabinet is expanded to a usable form. When the cabinet top 160 is attached or coupled to the cabinet 100 to form the top of the cabinet, the cabinet top 160 provides additional structural support to the expanded cabinet.

Figure 8:
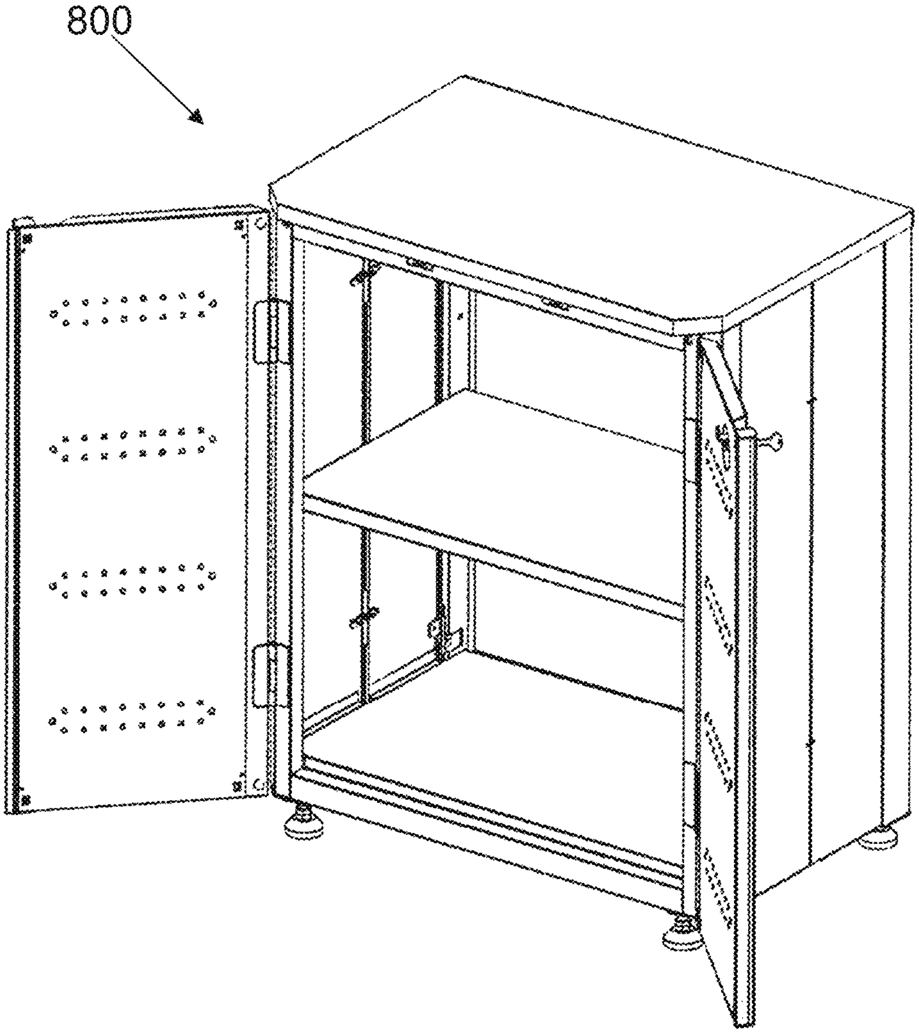
FIG. 8 shows a front perspective view of a floor standing cabinet with one shelf according to one exemplary embodiment.
Figure 9:
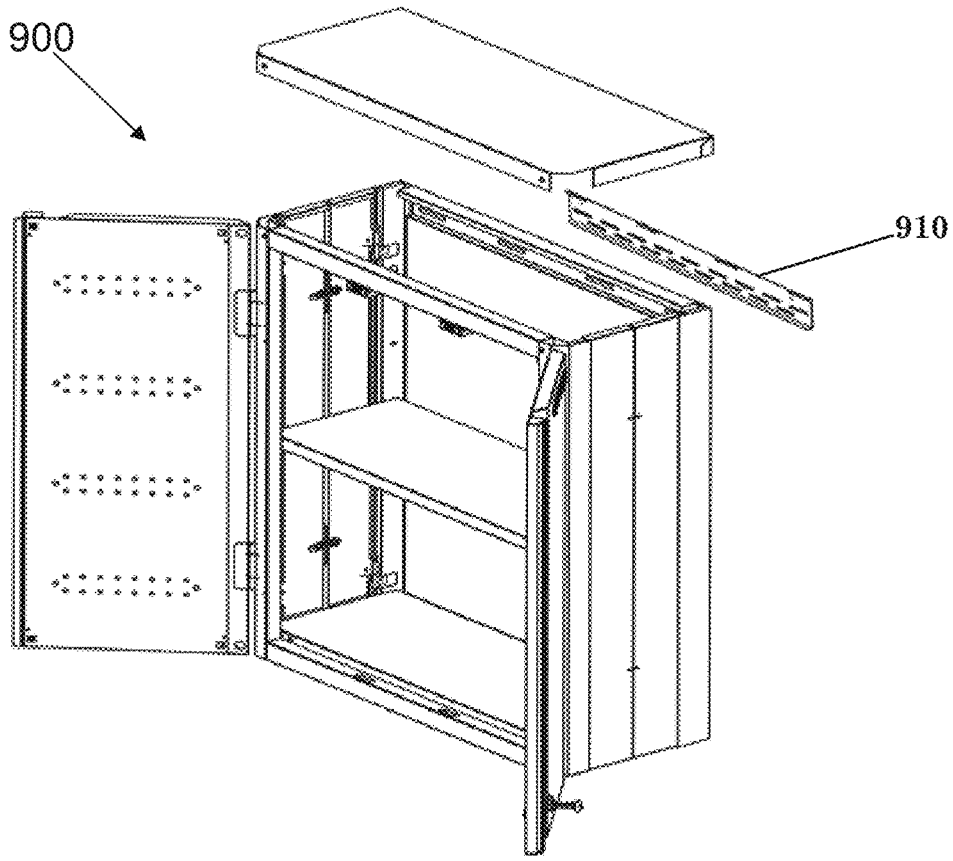
FIG. 9 illustrates a front perspective view of a wall mounted cabinet with one shelf according to one exemplary embodiment.

The concepts and principles of foldable sidewalls, foldable shelves, foldable cabinet bottom, and removeable cabinet top have been illustrated in FIGS. 1A to 7 and described in the context of a foldable or collapsible cabinet with multiple shelves. However, these concepts and principles are not limited to any cabinet with any particular size or dimensions. For example, these concepts and principles could be applied to a smaller floor standing cabinet 800 with one shelf as shown in FIG. 8, or to an even smaller wall mount cabinet 900 with one shelf as shown in FIG. 9 (with a wall mounted bracket 910). In general, these concepts and principles could be applied to cabinets with any size or dimensions.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. While various embodiments of the invention have been described, it will be apparent to those of ordinary skill in the art that many more embodiments and implementations are possible within the scope of this invention. Moreover, various features and functionalities described in this application and Figures may be combined individually and/or plurality of features and functionalities with others. Accordingly, the invention is not to be restricted except in light of the attached claims and their equivalents. the known and customary practice within the art to which the invention pertains.

The invention claimed is:

1. A cabinet, comprising:

a front;

a back wall;

a first sidewall rotatably coupled to the front and to the back wall, wherein the first sidewall is rotated inward when the cabinet is folded or collapsed, and outward when the cabinet is expanded, and wherein the first sidewall includes a front portion pivotally coupled to a back portion such that the front portion and the back portion are folded when the cabinet is folded or collapsed, and expanded when the cabinet is expanded;

a second sidewall rotatably coupled to the front and to the back wall, wherein the second sidewall is rotated inward when the cabinet is folded or collapsed, and outward when the cabinet is expanded, and wherein the second sidewall includes a front portion pivotally coupled to a back portion such that the front portion and the back portion are folded when the cabinet is folded or collapsed, and expanded when the cabinet is expanded; and a first hinge base bracket mounted on the front portion of the first sidewall;

a second hinge base bracket mounted on the back portion of the first sidewall; and a strap hinge used to pivotally couple the front portion of the first sidewall to the back portion of the first sidewall, and wherein the strap hinge includes a hinge bracket mounted on top of the first hinge base bracket and the second hinge base bracket, and wherein the strap hinge includes strap portions that are coupled to the first hinge base bracket, the second hinge base bracket, and the hinge bracket to connect the front portion to the back portion of the first sidewall, and wherein the strap portions are generally oval-shaped rings and are received through holes on opposite ends of the hinge bracket to rotatably couple to the hinge bracket such that when the first sidewall is folded, the strap portions rotate around the opposite ends of the hinge bracket to allow the first sidewall to be folded.

2. The cabinet of claim 1, further comprising:

at least one shelf that is folded upward and backward toward the back wall when the cabinet is folded or collapsed, and folded downward and forward toward the front when the cabinet is expanded into a usable configuration.

3. The cabinet of claim 2, wherein the at least one shelf includes a latch used to secure and hold the at least one shelf in place.

4. The cabinet of claim 1, further comprising:

a cabinet bottom that is folded upward and backward toward the back wall when the cabinet is folded or collapsed, and folded downward and forward toward the front when the cabinet is expanded into a usable configuration.

5. The cabinet of claim 4, wherein the cabinet top includes a latch used to secure and hold the at least one shelf in place.

6. The cabinet of claim 1, further comprising:

a cabinet top that is removed when the cabinet is folded or collapsed, and is attached or coupled to the cabinet when the cabinet is expanded into a useable configuration.

7. The cabinet of claim 1, further comprising:

a first hinge base bracket mounted on the front portion of the second sidewall;

a second hinge base bracket mounted on the back portion of the second sidewall; and a strap hinge used to pivotally couple the front portion of the second sidewall to the back portion of the second sidewall, and wherein the strap hinge includes a hinge bracket mounted on top of the first hinge base bracket and the second hinge base bracket, and wherein the strap hinge includes strap portions that are coupled to the first hinge base bracket, the second hinge base bracket, and the hinge bracket to connect the front portion to the back portion of the second sidewall, and wherein the strap portions are generally oval-shaped rings and are received through holes on opposite ends of the hinge bracket to rotatably couple to the hinge bracket such that when the second sidewall is folded, the strap portions rotate around the opposite ends of the hinge bracket to allow the second sidewall to be folded.

* * * * *